United States Patent
Rivera

(10) Patent No.: US 6,786,592 B2
(45) Date of Patent: Sep. 7, 2004

(54) INTERCHANGEABLE LENS EYEGLASS SYSTEM WITH INTERCHANGEABLE NOSEPIECE

(76) Inventor: John C. Rivera, 4544 Old Pond Dr., Plano, TX (US) 75024

( * ) Notice: Subject to any disclaimer, the term of this patent is extended or adjusted under 35 U.S.C. 154(b) by 0 days.

(21) Appl. No.: 10/155,148

(22) Filed: May 25, 2002

(65) Prior Publication Data

US 2003/0048407 A1 Mar. 13, 2003

Related U.S. Application Data

(62) Division of application No. 09/949,553, filed on Sep. 7, 2001, now Pat. No. 6,428,165.

(51) Int. Cl.[7] .................................................. G02C 1/08
(52) U.S. Cl. ............................. 351/95; 351/90; 351/91; 351/92
(58) Field of Search ............................ 351/95, 96, 92, 351/90, 91, 93, 94, 97, 98, 99, 100, 101, 102, 85, 86

(56) References Cited

U.S. PATENT DOCUMENTS

| | | |
|---|---|---|
| 1,236,497 A | 8/1917 | Stevens |
| 2,655,835 A | 10/1953 | Salierno .......................... 88/47 |
| 2,781,693 A | 2/1957 | Brumby .......................... 88/47 |
| 3,826,564 A | 7/1974 | Werling, Sr. .................. 351/45 |
| 4,176,921 A | 12/1979 | Matthias ....................... 351/106 |
| 4,345,824 A | 8/1982 | Daubignard .................. 351/98 |
| 4,550,989 A | 11/1985 | Hafner ........................ 351/103 |
| 4,693,573 A | 9/1987 | Zoueki ........................ 351/204 |
| 4,813,775 A | 3/1989 | Kaksonen ..................... 351/92 |
| 4,988,185 A | 1/1991 | Feinbloom ................... 351/233 |
| 5,098,180 A | 3/1992 | Tobey .......................... 351/97 |
| 5,293,185 A | 3/1994 | Berger et al. ................. 351/95 |
| 5,467,148 A | 11/1995 | Conway ....................... 351/85 |
| 5,579,062 A | 11/1996 | Sondrol ....................... 351/92 |
| 5,587,747 A | 12/1996 | Bernheiser .................. 351/105 |
| 5,602,603 A | 2/1997 | Bondet ......................... 351/41 |
| 6,074,059 A | 6/2000 | Glass et al. ................... 351/86 |

Primary Examiner—Hung X. Dang
(74) Attorney, Agent, or Firm—Rudolf O. Siegesmund

(57) ABSTRACT

A method for assembling eyeglasses is disclosed. The method consists of selecting a pair of lenses from an inventory of circular lenses according to a patient's prescription. The circular lenses have the same geometric and optical center, so they do not require ground (grinded) decentration. The round shape also allows the lenses to be rotated within the eyewires when the clasps are open. The lenses are mounted into the annular eyewires of the eyeglasses, rotated so that the cylindrical axis is appropriately aligned, and secured in place so that the lenses may not rotate. The correct pupillary distance is achieved by varying the width of the nosepiece. Bifocal lenses may be selected based on the patient's bifocal prescription and positioned on the existing lens according to the bifocal markings on the eyewires.

8 Claims, 3 Drawing Sheets

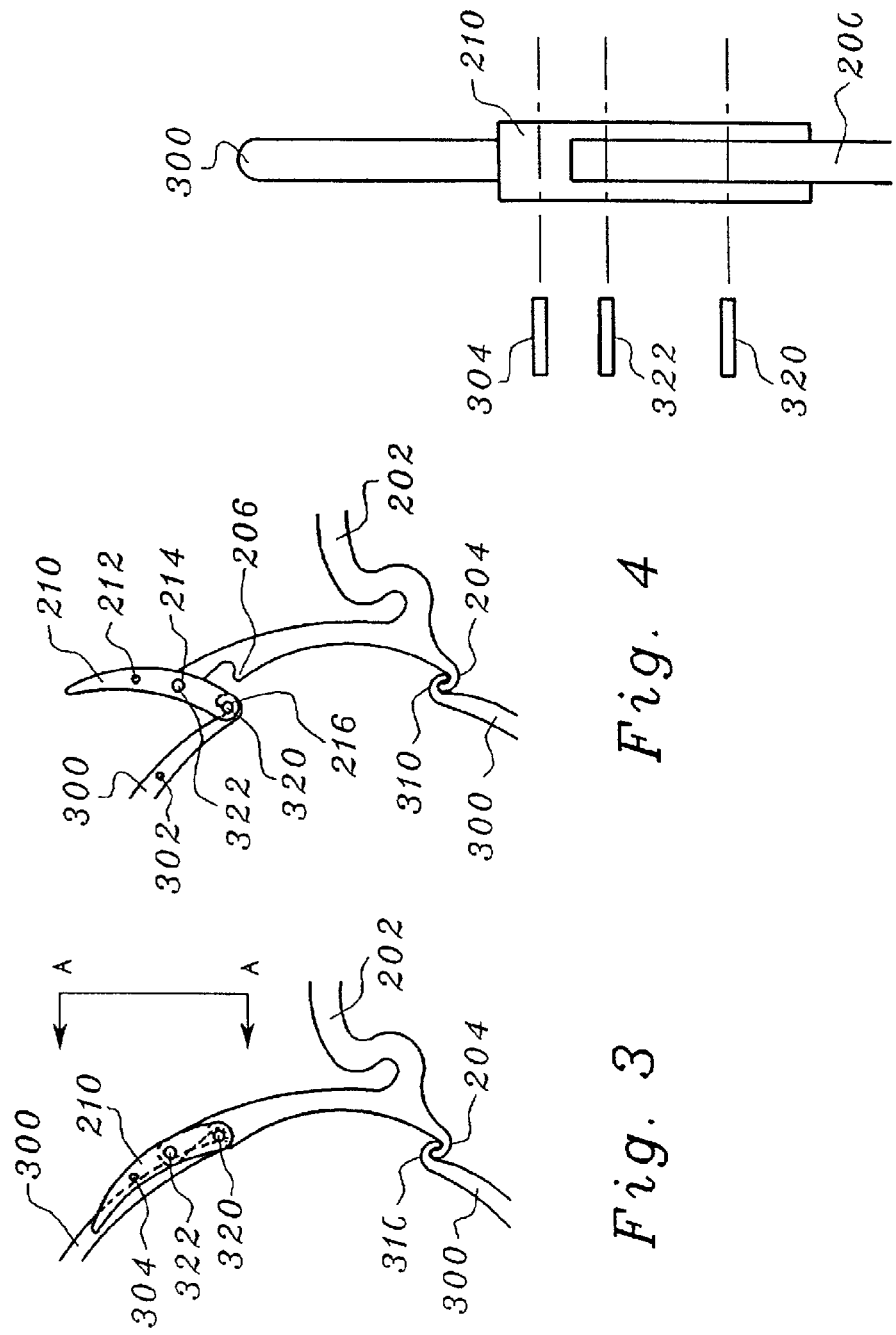

US 6,786,592 B2

INTERCHANGEABLE LENS EYEGLASS SYSTEM WITH INTERCHANGEABLE NOSEPIECE

This application is a division of application Ser. No. 09/949,553, filed on Sep. 7, 2001 now U.S. Pat. No. 6,428,165.

FIELD OF INVENTION

The present invention is directed to eyeglasses with removable and interchangeable lenses and a removable and interchangeable nosepiece, an eyeglass system based on the eyeglasses, a method for assembling the eyeglasses, and a method for positioning and securing additional bifocal segments to the eyeglass lenses.

BACKGROUND

Manufacturing eyeglasses can be a costly and time-consuming process. The eyewires must be fitted so that the optical centers of the lenses are aligned with the patient's eyes. The patient's prescription is defined by the pupillary distance, the distance between the patient's pupils, and spherical and cylindrical corrective factors. Lenses that provide cylindrical correction, unlike purely spherical lenses, must maintain alignment along a prescribed axis that varies from patient to patient. Therefore, in manufacturing traditional prescription glasses, the lenses must be ground to fit the eyewire and also correctly oriented based on their spherical and cylindrical properties.

Preparing prescription glasses includes the process of marking and layout to determine optical center and cylindrical axis of the lens. The lenses are then traced and cut to the shape of the eyewire. If the geometric center of the eyewires does not match the optical center position of the lenses, the lenses are ground to change the position of the optical center in a process called decentration. Finally, the lenses must be beveled and mounted to the eyewires. Any errors made during this process usually cannot be corrected and the process must begin anew. Often a defect in lens manufacturing cannot be discovered until the optometrist verifies that the glasses fit the patient's prescription. Errors discovered at this point may take weeks to correct.

Interchangeable lenses are known in the prior art. U.S. Pat. No. 5,293,185 (the '185 patent) discloses an "Eyeglass Eyewire Permitting Interchanging Lenses" utilizing a spring loaded closure for securing the lenses within the eyewires. What is needed beyond the '185 patent is an interchangeable prescription lens system that does not require the lenses to go through marking, layout, tracing, cutting, decentration, and beveling, allowing optical dispensers to provide prescription glasses to their patients in a matter of minutes. An interchangeable nosepiece which can change lens decentration without recutting the lenses is also needed. Furthermore, a need exists for an interchangeable prescription lens system that can provide glasses, including bifocals, in the areas of temporary prescriptive eyewear, optical retail environments, military field environments requiring rapid replacement of eyeglasses, and remote lip locations where standard optical manufacturing is impractical.

SUMMARY OF INVENTION

An apparatus meeting the above stated needs is an Interchangeable Lens Eyeglass System with Interchangeable Nosepiece comprising a nosepiece coupled to a pair of annular eyewires, and a pair of clasps hinged to the nosepiece that cooperate with each of the two annular eyewires to secure the lenses. Each clasp and eyewire contains a locking hole into which a pin may be inserted to secure the clasp in the closed position. The eyeglasses also contain a pair of temples, each of which is pivotally joined to each of the eyewires. The eyewires have axial markings that indicate the cylindrical axis of the lenses, and bifocal markings that indicate the correct position of the bifocal segments so that lenses may be installed and removed without the need for instruments or tools.

Additionally, a method for assembling eyeglasses in the Interchangeable Lens Eyeglass System with Interchangeable Nosepiece is disclosed. The method consists of selecting a pair of lenses from an inventory of circular lenses according to a patient's prescription. The circular lenses have the same geometric and optical center, so they do not require decentration by grinding. The round shape also allows the lenses to be rotated within the eyewires when the clasps are open. The lenses are mounted into the annular eyewires of the eyeglasses, rotated so that the cylindrical axis is appropriately aligned, and secured in place so that the lenses may not rotate. The correct pupillary distance is achieved by varying the width of the nosepiece. Bifocal lenses may be selected based on the patient's bifocal prescription and positioned on the existing lens according to the bifocal markings on the eyewires.

BRIEF DESCRIPTION OF FIGURES

FIG. 3 is a detailed frontal elevation view of the preferred embodiment of the Interchangeable Lens Eyeglass System with Interchangeable Nosepiece with the clasp in its closed position;

FIG. 4 is a detailed frontal elevation view of the preferred embodiment of the Interchangeable Lens Eyeglass System with Interchangeable Nosepiece with the clasp in its opened position;

FIG. 6 is a detailed side elevation of the preferred embodiment of the Interchangeable Lens Eyeglass System with Interchangeable Nosepiece along line a—a in FIG. 3 showing the clasp and pin placement.

DESCRIPTION OF PREFERRED EMBODIMENT

Figure 1:
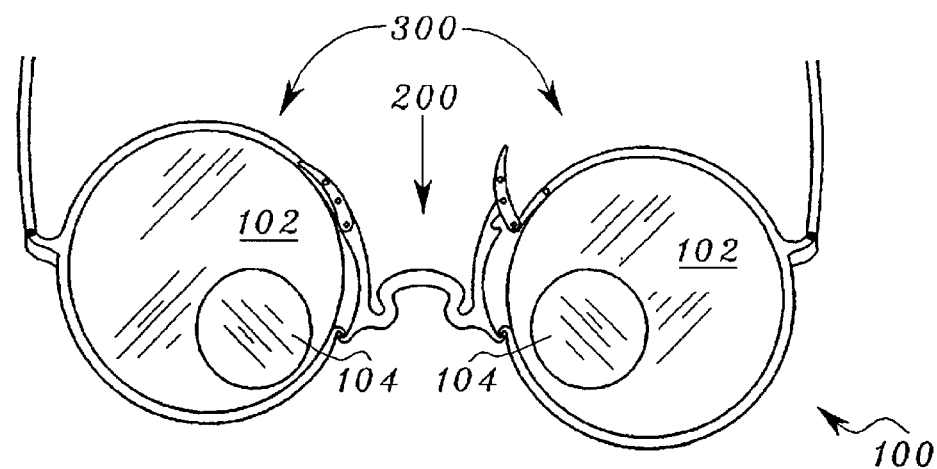
FIG. 1 is a frontal elevation view of the preferred embodiment of the Interchangeable Lens Eyeglass System with Interchangeable Nosepiece with bifocal additions showing the left clasp closed and the right clasp is open.

FIG. 1 shows eyeglasses 100 with two lenses 102 and two optional bifocal segments 104. Lenses 102 are secured by the tension created around eyewire 300 when clasp 210 is closed (see FIG. 2). Bifocal segments 104, if required, may be secured to lenses 102 by an adhesive.

Figure 2:
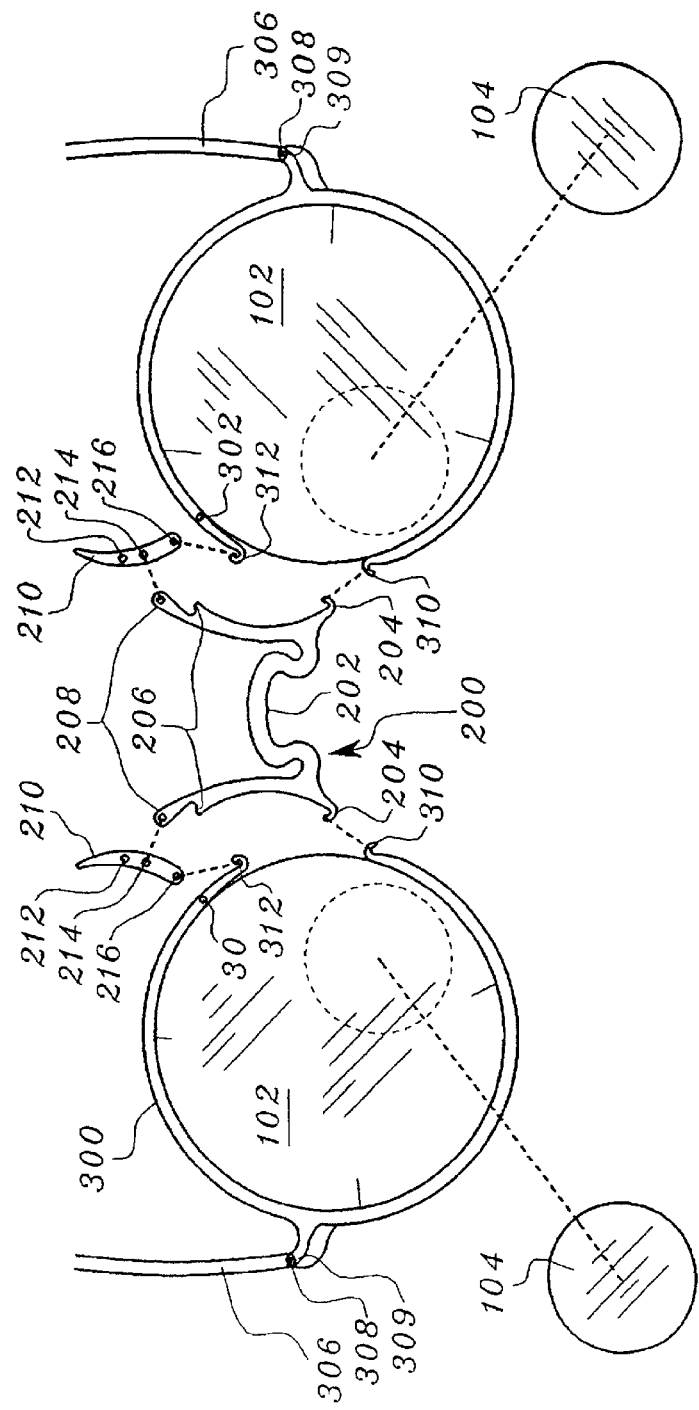
FIG. 2 is an exploded frontal elevation view of the preferred embodiment of the Interchangeable Lens Eyeglass System with Interchangeable Nosepiece.

Referring to FIG. 2, nosepiece 200 contains nose rest 202, nosepiece hooks 204, nosepiece arms 206, and nosepiece holes 208. Nose rest 202 is adapted to rest on the patient's nose (not shown) and is not limited to the style and type described by the preferred embodiment. Nose rest 202 may vary in width and design as determined by those skilled in the art. Nosepiece hook 204 projects downwardly from nose rest 202 and couples with eyewire lower hook 310. Projecting upwardly from nose rest 202, nosepiece 200 contains nosepiece arm 206, extending outwardly from nosepiece 200. Nosepiece arm 206 is shaped to accommodate eyewire upper hook 312 when clasp 210 is moved into the closed position. Nosepiece 200 extends upwardly from nosepiece arm 206 and contains nosepiece hole 208. Nosepiece hole 208 is a round aperture in nosepiece 200. Clasp 210 is pivotally connected to nosepiece 200 by inserting hinge pin 322 in nosepiece hole 208.

Referring to FIG. 6, Clasp 210 has two forks spaced apart to accommodate nosepiece 200, nosepiece arm 206, and eyewire 300. As seen in FIG. 4, clasp 210 has clasp locking hole 212, clasp hinge hole 214, and clasp anchor hole 216. Clasp 210 is pivotally joined to eyewire 300 by anchor pin 320 through clasp anchor hole 216 and eyewire upper hook 312. Clasp 210 is pivotally joined to nosepiece 200 by hinge pin 322 through clasp hinge hole 214 and nosepiece hole 208. As seen in FIG. 3, clasp 210 can be secured in its closed position by inserting locking pin 304 though clasp locking hole 212 and eyewire locking hole 302.

Figure 5:
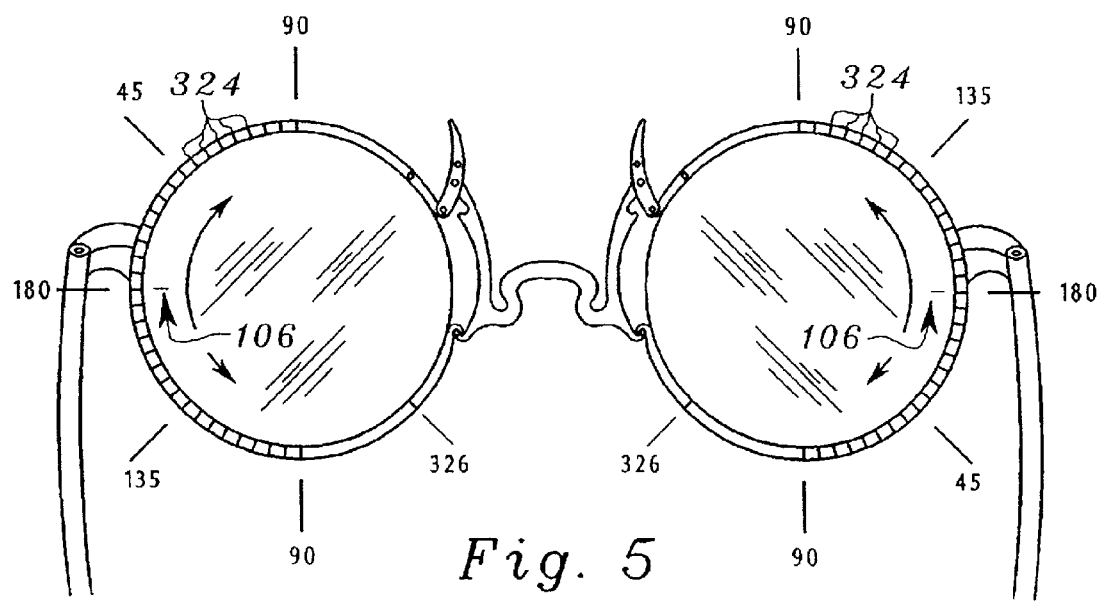
FIG. 5 is a rear elevation view of the preferred embodiment of the Interchangeable Lens Eyeglass System with Interchangeable Nosepiece showing the axis orientation, the axis markings, and the bifocal markings.

Referring to FIG. 2, eyeglasses 100 contain eyewires 300 which are annular in shape and join to nosepiece 200, clasp 210, and temple 306. Eyewire 300 contains eyewire lower hook 310, eyewire upper hook 312, and eyewire temple hole 309. Eyewire 300 is pivotally joined to clasp 210 by anchor pin 320 through C-shaped eyewire upper hook 312 and clasp anchor hole 216. Eyewire 300 secures clasp 210 in its closed position by locking pin 304 through eyewire locking hole 302 and clasp locking hole 212. Eyewire 300 is joined to nosepiece 200 by the coupling of eyewire lower hook 310 and nosepiece hook 204. Eyewire 300 is pivotally joined to temple 306 by temple pin 308 inserted through temple hole 307 and into eyewire temple hole 309. Persons skilled in the art will be aware of additional ways to connect temple 306 to eyewire 300. Referring to FIG. 5, eyeglasses 100 contain a plurality of axis markings 324 on the rear face of eyewire 300. Axis markings 324 represent the cylindrical axis alignment for lens 102. Lens 102 has axis mark 106 to indicate its cylindrical axis. Eyewire 300 also contains bifocal marking 326. Bifocal marking 326 is used to position bifocal 104.

Eyeglasses 100 fit together with lenses 102 in a process that does not require marking, layout, tracing, cutting, decentration, or beveling at the time of assembly. The elimination of these steps significantly reduces the time and cost of assembling and preparing eyeglasses 100. The process of using eyeglasses 100 requires assembling an inventory of circular, pre-finished lenses 102 of a fixed diameter with the same geometric and optical centers. Each lens 102 having a cylindrical correction also contains axis mark 106, which is an indicator of the cylindrical axis of lens 102. Each lens 102 in the inventory of lenses 102 is shaped along its edge to fit into the annulus of eyewire 300. A variety of different width nosepieces 200 are maintained. An appropriate nosepiece 200 is selected based on the pupillary distance of the patient. The width of nosepiece 200 is appropriate if the geometric and optical centers of lenses 102 are spaced at the appropriate pupillary distance as required by the patient's prescription. The appropriate nose rest 202 design is selected with nosepiece 200 to accommodate the patient's nose shape.

Clasp 210 is attached to nosepiece 200 by inserting hinge pin 322 through clasp hinge hole 214 and nosepiece hole 208. Nosepiece 200 is then joined to eyewire 300 by coupling nosepiece hook 204 to eyewire lower hook 310. Clasp 210 is attached to eyewire 300 by inserting anchor pin 320 through clasp anchor hole 216 and eyewire upper hook 312. Eyewire 300 is attached to temple 306 by inserting temple pin 308 through temple hole 307 and eyewire temple hole 309.

A lens 102 is selected based on the patient's prescription. Lens 102 is then inserted into the annulus of eyewire 300. Next, axis mark 106 on lens 102 is aligned with the appropriate axis marking 324 on eyewire 300. When lens 102 has been aligned according to the patient's prescription, clasp 210 is closed. The patient verifies that the lenses are the correct prescription. If eyeglasses 100 are satisfactory, locking pin 304 may be installed through clasp locking hole 212 and eyewire locking hole 302 to secure clasp 210 in its closed position.

The addition of bifocal segments 104 to lenses 102 creates a pair of bifocal glasses. Bifocal segments may be affixed to lens 102 without altering either lens 102 or bifocal segment 104. In order to create a pair of bifocal glasses, an inventory of different strength bifocal segments 104 is assembled. Bifocal segment 104 is selected based on the patient's prescription. Bifocal segment 104 is adhered to lens 102 with an appropriate adhesive. The placement of bifocal segment 104 on lens 102 is determined by the patient's prescription. Placement of lens 102 with bifocal segment 104 affixed to eyewires 300 is determined by bifocal marking 326 on the back of eyewire 300.

It is to be understood that while certain forms of the preferred embodiment of eyeglasses 100 have been described herein, it is not to be limited to the specific forms or arrangement of parts described and shown here except insofar as such forms are included in the following claims.

What is claimed is:

1. A method for assembling eyeglasses comprising:

selecting a lens from an inventory containing a plurality of circular lenses, each of said circular lenses having the same geometric and optical center, and a range of prescriptive dimensions;

mounting the lens to the annular eyewire of the eyeglasses;

rotating the lens to align a lens axis mark with an eyewire axis mark so that the lens' cylindrical axis is aligned according to a patient's prescription; and securing the lens in place so the lens cannot rotate.

2. The method of claim 1 wherein the step of securing the lens further comprises selecting a nosepiece with an appropriate width from an inventory having a range of sizes of nosepieces; and securing the lens in place with the nosepiece.

3. The method of claim 2 further comprising the step of selecting the appropriate width by determining if a geometric and an optical center of the lens will be spaced at a pupillary distance required by the patient's prescription.

4. The method of claim 1 wherein the inventor further comprises a plurality of lenses wherein each of said plurality of lenses does not require decentration by grinding.

5. The method of claim 1 wherein the circular shape of the lens allows the lens to be rotated within the annular eyewire prior to being secured.

6. The method of claim 1 wherein decentration of the optical centers of the lenses is accomplished by selection of an interchangeable nosepiece with a width selected in accordance with a patient's prescription.

7. A method for assembling eyeglasses comprising:

using an interchangeable lens eyeglass system having an annular eyewire, a nosepiece, and a clasp pivotally joined to the nosepiece, selecting a lens from an inventory containing a plurality of circular lenses having the same geometric and optical center and a range of prescriptive dimensions;

mounting the lens to the annular eyewire of the eyeglasses;

rotating the lens so that the lens is aligned according to a patient's prescription;

securing the lens in place so that the lens cannot rotate by rotating the clasp from a first position to a second position.

8. The method of claim 7 wherein the step of rotating further comprises aligning a lens axis mark with an eyewire axis mark so that the lens' cylindrical axis is aligned according to the patient's prescription.

* * * * *

UNITED STATES PATENT AND TRADEMARK OFFICE
CERTIFICATE OF CORRECTION

PATENT NO. : 6,786,592 B2
DATED : September 9, 2004
INVENTOR(S) : Rivera

It is certified that error appears in the above-identified patent and that said Letters Patent is hereby corrected as shown below:

Column 1,
Line 60, "lip" should be deleted

Signed and Sealed this

Thirtieth Day of November, 2004

JON W. DUDAS
*Director of the United States Patent and Trademark Office*